United States Patent
Lan

(10) Patent No.: US 9,866,482 B2
(45) Date of Patent: Jan. 9, 2018

(54) PACKET TRANSMISSION METHOD AND APPARATUS

(71) Applicant: Huawei Technologies Co., Ltd., Shenzhen, Guangdong (CN)

(72) Inventor: Haiqing Lan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 14/750,329

(22) Filed: Jun. 25, 2015

(65) Prior Publication Data

US 2015/0295828 A1  Oct. 15, 2015

Related U.S. Application Data

(63) Continuation of application No. PCT/CN2012/087723, filed on Dec. 27, 2012.

(51) Int. Cl.
| | |
|---|---|
| *H04L 12/801* | (2013.01) |
| *H04L 12/835* | (2013.01) |
| *H04L 12/823* | (2013.01) |
| *H04L 12/861* | (2013.01) |

(52) U.S. Cl.
CPC .............. *H04L 47/12* (2013.01); *H04L 47/11* (2013.01); *H04L 47/30* (2013.01); *H04L 47/32* (2013.01); *H04L 49/9047* (2013.01)

(58) Field of Classification Search
CPC ............................ H04L 47/12; H04L 49/9047
See application file for complete search history.

(56) References Cited

U.S. PATENT DOCUMENTS

| | | | | |
|---|---|---|---|---|
| 2002/0110134 A1* | 8/2002 | Gracon | ................... | H04L 47/10 370/412 |
| 2002/0159388 A1* | 10/2002 | Kikuchi | ................. | H04L 12/66 370/229 |
| 2005/0195740 A1* | 9/2005 | Kwon | ................. | H04L 43/0882 370/229 |
| 2013/0114594 A1* | 5/2013 | Van Zijst | .............. | H04L 47/125 370/390 |

FOREIGN PATENT DOCUMENTS

| | | |
|---|---|---|
| CN | 1622531 A | 6/2005 |
| CN | 101043427 A | 9/2007 |
| CN | 101582842 A | 11/2009 |
| CN | 101616129 A | 12/2009 |
| CN | 101800699 A | 8/2010 |
| CN | 102413063 A | 4/2012 |
| GB | 2 367 713 A | 4/2002 |
| WO | WO 2006/091175 * | 8/2006 |
| WO | WO 2006/091175 A1 | 8/2006 |

\* cited by examiner

*Primary Examiner* — Andrew Lai
*Assistant Examiner* — Sumitra Ganguly

(57) ABSTRACT

A method of the present invention includes: determining, when packet congestion occurs or network bandwidth decreases, at least one to-be-discarded packet in a packet buffer; and discarding the at least one to-be-discarded packet so that at least one unbuffered packet enters the packet buffer to prevent discarding too many unbuffered packets, where the unbuffered packet is a packet that has not entered the packet buffer. The present invention is primarily applied in a packet buffering process.

10 Claims, 6 Drawing Sheets

PACKET TRANSMISSION METHOD AND APPARATUS

CROSS-REFERENCE TO RELATED APPLICATIONS

This application is a continuation of International Application No. PCT/CN2012/087723, filed on Dec. 27, 2012, which is hereby incorporated by reference in its entirety.

TECHNICAL FIELD

The present invention relates to the field of communications technologies, and in particular, to a packet transmission method and apparatus.

BACKGROUND

Currently, packet transmission between devices or between modules in a device exists widely in a communications system. Generally, before packets are sent, congestion management needs to be performed on the packets to be sent, so as to reduce a packet loss ratio in a packet transmission process. In a congestion management stage, if buffer queues are full or a quantity of packets waiting to enter the buffer queues exceeds a limit value, a congestion management mechanism may discard the packets waiting to enter the buffer queues; if the buffer queues are not full or the quantity of packets waiting to enter the buffer queues does not reach the limit value, the congestion management mechanism adds the packets into the buffer queues, where a packet in the congestion management stage is an unbuffered packet. In a packet buffering stage, multiple packets are allocated to different queues, and wait for sending scheduling in order of queue entering time. In a sending scheduling stage, a sending scheduling mechanism retrieves the packets from the queues and sends them to a receive end.

In an existing packet transmission process, before being transmitted, a packet needs to undergo three stages of processing: congestion management, packet buffering, and sending scheduling. In both the congestion management stage and the sending scheduling stage, a differential processing mechanism based on packet importance exists. For example, when buffer queues are full or a quantity of unbuffered packets exceeds a limit value, the congestion management mechanism may discard some unbuffered packets; the sending scheduling mechanism may preferentially select packets in a queue of greater importance for sending. Such a differential processing mechanism, however, does not exist in the packet buffering stage. In a queue, packets are buffered only in order of queue entering time. When the queues are full or the limit value is exceeded, packets that are not buffered in the congestion management stage cannot enter a queue. Although some unbuffered packets can be discarded in the congestion management stage, a quantity of packets discarded in the congestion management stage increases with an increase in the quantity of unbuffered packets, and it is still unavoidable for the congestion management mechanism to discard important unbuffered packets, which affects quality of service (Quality of Service, QoS for short) of an important service.

SUMMARY

The present invention provides a packet transmission method and apparatus which can effectively mitigate a problem that too many packets are lost in a congestion management stage when congestion occurs abruptly between devices or between modules in a device.

According to a first aspect, the present invention provides a packet transmission method, where the method includes:

determining, when packet congestion occurs or network bandwidth decreases, at least one to-be-discarded packet in a packet buffer; and discarding the at least one to-be-discarded packet so that at least one unbuffered packet enters the packet buffer to prevent discarding too many unbuffered packets, where the unbuffered packet is a packet that has not entered the packet buffer.

In a first possible implementation manner of the first aspect, the determining at least one to-be-discarded packet in a packet buffer specifically includes:

allocating a quantity of to-be-discarded packets to each of at least one queue in the packet buffer, where the quantity of to-be-discarded packets is an integer greater than or equal to 0.

With reference to the first aspect or the first possible implementation manner of the first aspect, a second possible implementation manner of the first aspect is further provided. In the second possible implementation manner of the first aspect, the allocating a quantity of to-be-discarded packets to each of at least one queue in the packet buffer specifically includes:

allocating a quantity of to-be-discarded packets to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority; or allocating a quantity of to-be-discarded packets to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets.

With reference to the first aspect or the first or second possible implementation manner of the first aspect, a third possible implementation manner of the first aspect is further provided. In the third possible implementation manner of the first aspect, the determining at least one to-be-discarded packet in a packet buffer specifically includes:

selecting N packets at equal intervals in each queue according to an even distribution rule and determining that the N packets are to-be-discarded packets, where N is the quantity of to-be-discarded packets allocated to the queue; or selecting N packets randomly in each queue according to a random distribution rule and determining that the N packets are to-be-discarded packets, where N is the quantity of to-be-discarded packets allocated to the queue; or sorting the at least one queue according to a first sorting rule to obtain sorted queues, performing polling from one end of the sorted queues and determining that a first packet in each queue is a to-be-discarded packet; when a quantity of to-be-discarded packets of a queue reaches a quantity of to-be-discarded packets allocated to the queue, removing the queue from the sorted queues; and when a quantity of queues in the sorted queues is 0, ending the determining of to-be-discarded packets.

With reference to the first aspect or the first or second or third possible implementation manner of the first aspect, a fourth possible implementation manner of the first aspect is further provided. In the fourth possible implementation manner of the first aspect, the discarding the at least one to-be-discarded packet specifically includes:

discarding the at least one to-be-discarded packet according to a preset packet discarding rule.

With reference to the first aspect or the first or second or third or fourth possible implementation manner of the first aspect, a fifth possible implementation manner of the first aspect is further provided. In the fifth possible implementation manner of the first aspect, the discarding the at least one to-be-discarded packet according to a preset packet discarding rule specifically includes:

acquiring an index identifier of each to-be-discarded packet to generate a to-be-discarded packet group, where the index identifier is a combination of a queue identifier of the to-be-discarded packet and a location identifier of the to-be-discarded packet;

determining whether a to-be-discarded packet that is not discarded remains in the to-be-discarded packet group; and selecting, when a result of the determining is yes, a to-be-discarded packet corresponding to at least one index identifier to discard it.

With reference to the first aspect or the first or second or third or fourth or fifth possible implementation manner of the first aspect, a sixth possible implementation manner of the first aspect is further provided. In the sixth possible implementation manner of the first aspect, the discarding the at least one to-be-discarded packet according to a preset packet discarding rule specifically includes:

acquiring, after each to-be-discarded packet is determined, an index identifier of the to-be-discarded packet, and discarding the to-be-discarded packet according to the index identifier.

With reference to the first aspect or the first or second or third or fourth or fifth or sixth possible implementation manner of the first aspect, a seventh possible implementation manner of the first aspect is further provided. In the seventh possible implementation manner of the first aspect, before the determining at least one to-be-discarded packet in a packet buffer, the method further includes:

determining a total quantity of to-be-discarded packets;

allocating a first quantity of to-be-discarded packets to the packet buffer for discarding, where the first quantity of to-be-discarded packets is less than or equal to the total quantity of to-be-discarded packets; and the determining at least one to-be-discarded packet in a packet buffer specifically includes:

determining that packets, of the first quantity of to-be-discarded packets, in the packet buffer are to-be-discarded packets.

According to a second aspect, the present invention provides a packet transmission apparatus, where the apparatus includes:

a determining unit, configured to determine, when packet congestion occurs or network bandwidth decreases, at least one to-be-discarded packet in a packet buffer; and a discarding unit, configured to discard the at least one to-be-discarded packet determined by the determining unit so that at least one unbuffered packet enters the packet buffer to prevent discarding too many unbuffered packets, where the unbuffered packet is a packet that has not entered the packet buffer.

In a first possible implementation manner of the second aspect, the determining unit specifically includes:

an allocating subunit, configured to allocate a quantity of to-be-discarded packets to each of at least one queue in the packet buffer, where the quantity of to-be-discarded packets is an integer greater than or equal to 0.

With reference to the second aspect or the first possible implementation manner of the second aspect, a second possible implementation manner of the second aspect is further provided, where the allocating subunit is specifically configured to:

allocate a quantity of to-be-discarded packets to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority; or allocate a quantity of to-be-discarded packets to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets.

With reference to the second aspect or the first or second possible implementation manner of the second aspect, a third possible implementation manner of the second aspect is further provided. In the third possible implementation manner of the second aspect, the determining unit further includes:

a determining subunit, configured to:

select N packets at equal intervals in each queue according to an even distribution rule and determine that the N packets are to-be-discarded packets, where N is the quantity of to-be-discarded packets allocated by the allocating subunit to the queue; or select N packets randomly in each queue according to a random distribution rule and determine that the N packets are to-be-discarded packets, where N is the quantity of to-be-discarded packets allocated by the allocating subunit to the queue; or sort the at least one queue according to a first sorting rule to obtain sorted queues, perform polling from one end of the sorted queues and determine that a first packet in each queue is a to-be-discarded packet; when a quantity of to-be-discarded packets of a queue reaches a quantity of to-be-discarded packets allocated by the allocating subunit to the queue, remove the queue from the sorted queues; and when a quantity of queues in the sorted queues is 0, end the determining of to-be-discarded packets.

With reference to the second aspect or the first or second or third possible implementation manner of the second aspect, a fourth possible implementation manner of the second aspect is further provided. In the fourth possible implementation manner of the second aspect, the discarding unit is specifically configured to discard, according to a preset packet discarding rule, the at least one to-be-discarded packet determined by the determining unit.

With reference to the second aspect or the first or second or third or fourth possible implementation manner of the second aspect, a fifth possible implementation manner of the second aspect is further provided. In the fifth possible implementation manner of the second aspect, the discarding unit specifically includes:

an acquiring subunit, configured to acquire an index identifier of each to-be-discarded packet to generate a to-be-discarded packet group, where the index identifier is a combination of a queue identifier of the to-be-discarded packet and a location identifier of the to-be-discarded packet;

a determining subunit, configured to determine whether a to-be-discarded packet that is not discarded remains in the to-be-discarded packet group generated by the acquiring subunit; and a discarding subunit, configured to select, when a result of the determining by the determining subunit is yes, a to-be-discarded packet corresponding to at least one index identifier to discard it.

With reference to the second aspect or the first or second or third or fourth or fifth possible implementation manner of the second aspect, a sixth possible implementation manner of the second aspect is further provided. In the sixth possible implementation manner of the second aspect, the acquiring subunit is further configured to acquire, after each to-be-discarded packet is determined by the determining unit, an index identifier of the to-be-discarded packet; and the discarding subunit is further configured to discard the to-be-discarded packet according to the index identifier acquired by the acquiring subunit.

With reference to the second aspect or the first or second or third or fourth or fifth or sixth possible implementation manner of the second aspect, a seventh possible implementation manner of the second aspect is further provided. In the seventh possible implementation manner of the second aspect, the apparatus further includes:

a management unit, configured to:
determine a total quantity of to-be-discarded packets;
allocate a first quantity of to-be-discarded packets to the packet buffer for discarding, where the first quantity of to-be-discarded packets is less than or equal to the total quantity of to-be-discarded packets; and
determine that packets, of the first quantity of to-be-discarded packets, in the packet buffer are to-be-discarded packets.

According to a third aspect, the present invention provides a packet transmission apparatus, where the apparatus includes:

a receiver, configured to receive a to-be-sent packet;
a buffer, configured to buffer the packet received by the receiver;
a processor, configured to: when packet congestion occurs or network bandwidth decreases, determine at least one to-be-discarded packet in packets buffered by the buffer; discard the at least one to-be-discarded packet so that at least one unbuffered packet enters the buffer to prevent discarding too many unbuffered packets, where the unbuffered packet is a packet that has not entered the buffer.

In a first possible implementation manner of the third aspect, the processor is specifically configured to:
allocate a quantity of to-be-discarded packets to each of at least one queue in the buffer, where the quantity of to-be-discarded packets is an integer greater than or equal to 0.

With reference to the third aspect or the first possible implementation manner of the third aspect, a second possible implementation manner of the third aspect is further provided. In the second possible implementation manner of the third aspect, the processor is further specifically configured to:

allocate a quantity of to-be-discarded packets to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority; or allocate a quantity of to-be-discarded packets to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets.

With reference to the third aspect or the first or second possible implementation manner of the third aspect, a third possible implementation manner of the third aspect is further provided. In the third possible implementation manner of the third aspect, the processor is further specifically configured to:

select N packets at equal intervals in each queue according to an even distribution rule and determine that the N packets are to-be-discarded packets, where N is the quantity of to-be-discarded packets allocated to the queue; or select N packets randomly in each queue according to a random distribution rule and determine that the N packets are to-be-discarded packets, where N is the quantity of to-be-discarded packets allocated to the queue; or sort the at least one queue according to a first sorting rule to obtain sorted queues, perform polling from one end of the sorted queues and determine that a first packet in each queue is a to-be-discarded packet; when a quantity of to-be-discarded packets of a queue reaches a quantity of to-be-discarded packets allocated to the queue, remove the queue from the sorted queues; and when a quantity of queues in the sorted queues is 0, end the determining of to-be-discarded packets.

With reference to the third aspect or the first or second or third possible implementation manner of the third aspect, a fourth possible implementation manner of the third aspect is further provided. In the fourth possible implementation manner of the third aspect, the processor is specifically configured to:

discard the at least one to-be-discarded packet according to a preset packet discarding rule.

With reference to the third aspect or the first or second or third or fourth possible implementation manner of the third aspect, a fifth possible implementation manner of the third aspect is further provided. In the fifth possible implementation manner of the third aspect, the processor is specifically configured to:

acquire an index identifier of each to-be-discarded packet to generate a to-be-discarded packet group, where the index identifier is a combination of a queue identifier of the to-be-discarded packet and a location identifier of the to-be-discarded packet;

determine whether a to-be-discarded packet that is not discarded remains in the to-be-discarded packet group; and select, when a result of the determining is yes, a to-be-discarded packet corresponding to at least one index identifier to discard it.

With reference to the third aspect or the first or second or third or fourth or fifth possible implementation manner of the third aspect, a sixth possible implementation manner of the third aspect is further provided. In the sixth possible implementation manner of the third aspect, the processor is specifically configured to:

acquire, after each to-be-discarded packet is determined, an index identifier of the to-be-discarded packet, and discard the to-be-discarded packet according to the index identifier.

With reference to the third aspect or the first or second or third or fourth or fifth or sixth possible implementation manner of the third aspect, a seventh possible implementation manner of the third aspect is further provided. In the seventh possible implementation manner of the third aspect, the processor is further specifically configured to:

determine a total quantity of to-be-discarded packets;

allocate a first quantity of to-be-discarded packets to the buffer, where the first quantity of to-be-discarded packets is less than or equal to the total quantity of to-be-discarded packets; and determine that packets, of the first quantity of to-be-discarded packets, in the buffer are to-be-discarded packets.

The packet transmission method and apparatus provided in the present invention can discard some packets in a buffer queue when the buffer queue is full or a limit value is exceeded, and a part of buffer space is vacated so that some unbuffered packets enter the buffer queue. Compared with the prior art in which a buffer queue is used only to buffer packets and no packet discarding mechanism exists in a buffer queue stage, the present invention can add an unbuffered important packet into a buffer queue in time, thereby relieving packet discarding pressure in a congestion management stage and preventing a congestion management mechanism from discarding an unbuffered packet of greater importance in time of abrupt congestion.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
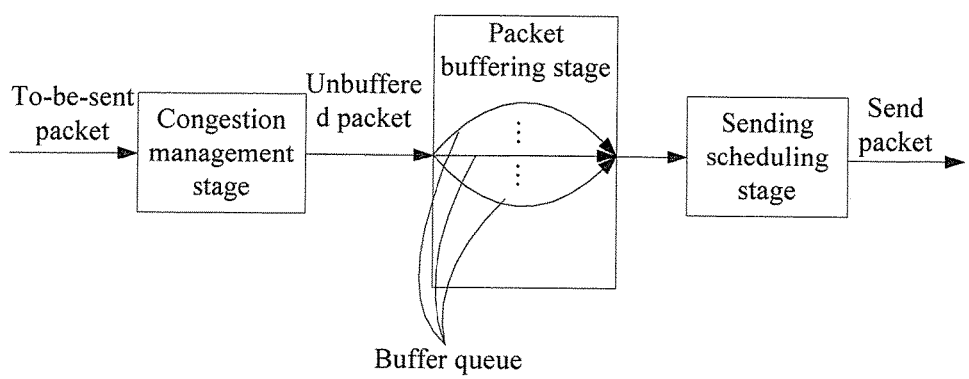
FIG. 1 is a schematic diagram of a packet transmission process according to an embodiment of the present invention.

To facilitate understanding of the embodiments of the present invention, a packet transmission process that the embodiments of the present invention are based on are described briefly first. As shown in FIG. 1, at a packet transmitting end, before being sent to a packet receiving end, a to-be-sent packet needs to sequentially undergo three stages of processing: congestion management, packet buffering, and sending scheduling. In the congestion management stage, if buffer queues are full, a congestion management mechanism may discard an unbuffered packet with a lower privilege according to a service QoS-differentiated processing mechanism to preferentially ensure that an unbuffered packet with a higher privilege can join a buffer queue; if the buffer queues are not full, the congestion management mechanism adds unbuffered packets into different queues in the buffer queues according to attributes, such as a packet type, a priority, and a packet size, of the unbuffered packets. The buffer queues buffer the added packets and the packets wait for sending scheduling in the sending scheduling stage. In the sending scheduling stage, if transmission resources are limited, a sending scheduling mechanism may preferentially send a packet with a higher privilege according to the service QoS-differentiated processing mechanism; if the transmission resources are enough, the sending scheduling mechanism sends all to-be-sent packets.

It should be noted that the packet buffering in the embodiments of the present invention is an equivalent concept of data buffering.

Figure 2:
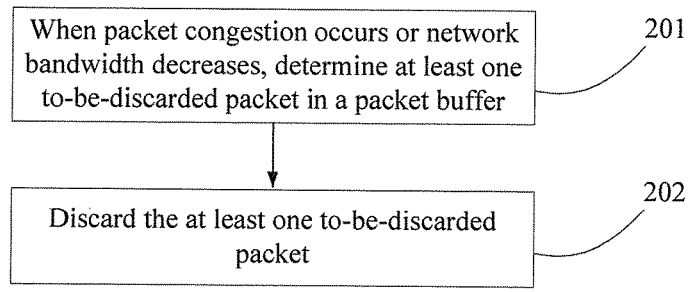
FIG. 2 is a flowchart of a packet transmission method according to an embodiment of the present invention.

As shown in FIG. 2, an embodiment of the present invention provides a packet transmission method, where the method includes the following steps:

201. When packet congestion occurs or network bandwidth decreases, determine at least one to-be-discarded packet in a packet buffer.

In this embodiment of the present invention, occurrence of packet congestion in buffer queues may be that congestion occurs in an entire packet buffer area that includes multiple queues, or that a buffer of the packet buffer area is full. When packet congestion occurs in the buffer queues, one or more packets in the packet buffer area are selected as to-be-discarded packets. Specifically, whether packet congestion occurs in buffer queues may be monitored in the following two manners:

1) Whether a quantity of packets that have entered the buffer queues exceeds a preset limit value is monitored; if the quantity of packets that have entered the buffer queues exceeds the preset limit value, it is detected that congestion occurs in the buffer queues. The quantity of packets that have entered the buffer queues is the sum of packets that have entered the buffer queues in all the queues, that is, a total quantity of packets that have entered the packet buffer area. The preset limit value may be one proportion value or one absolute numerical value. The preset limit value may be a quantity of packets buffered in the packet buffer area when the buffer of the packet buffer area is full, or may be lower than the quantity of packets buffered in the packet buffer area when the buffer of the packet buffer area is full. With the preset limit value being one proportion value as an example, the preset limit value may be 100% or may be 80%. A setting of the preset limit value may be determined based on actual conditions of packet transmission, and this embodiment of the present invention does not limit the setting of the preset limit value.

2) If a packet discarding instruction is received, it is detected that packet congestion occurs in the buffer queues.

The packet discarding instruction may come from an upper-layer transmission management device, or may come from a congestion management device. When the upper-layer transmission management device discovers that the buffer queues are congested or when the congestion management device discovers that no packet can be added into the buffer queues, the packet discarding instruction is sent.

The at least one to-be-discarded packet determined in the packet buffer area may come from a specific queue or from multiple queues. To prevent centralized discarding of packets in a specific queue that causes severe impact on a service carried by the queue, to-be-discarded packets are generally determined in multiple queues. When to-be-discarded packets are determined in multiple queues, a quantity of packets to be discarded from a higher-priority queue is less than a quantity of packets to be discarded from a lower-priority queue.

202. Discard the at least one to-be-discarded packet.

After the at least one to-be-discarded packet is determined, the at least one to-be-discarded packet is discarded. During the discarding, all to-be-discarded packets may be discarded at a time, or discarded progressively according to a current congestion status of the buffer queues. For example, one or two packets are discarded at a time, and whether current network bandwidth increases is analyzed after every discarding; if the network bandwidth increases, the discarding is stopped, and remaining to-be-discarded packets are retained; if the network bandwidth does not increase, discarding is continued. This embodiment of the present invention does not limit a manner of packet discarding or a quantity of packets discarded at each time.

In the prior art, a buffer queue is used only for packet buffering. Based on a first-in-first-out rule, the buffer queue buffers packets in order of queue entering time of the packets. When the buffer queue is congested, a congestion management mechanism discards some unbuffered packets to relieve congestion pressure of the queue. Generally, the congestion management mechanism discards unbuffered packets of less importance to prevent discarding of unbuffered packets of greater importance and prevent affecting QoS of an important service. However, when the buffer queue remains congested, a quantity of unbuffered packets keeps increasing. If an unbuffered packet of even greater importance is added, the congestion management mechanism discards a previously unbuffered packet of greater importance, which affects the QoS of the important service.

The packet transmission method according to this embodiment of the present invention can discard some packets in a buffer queue when the buffer queue is congested, so that a part of buffer space is vacated to accommodate an unbuffered packet of greater importance in packets waiting to enter the buffer queue, thereby relieving packet discarding pressure in a congestion management stage. Compared with the prior art in which a buffer queue is used only for packet buffering and no packet discarding mechanism exists, the present invention can prevent a congestion management mechanism from discarding an unbuffered packet packet of greater importance during abrupt congestion and can ensure QoS of a service of greater importance.

Figure 3:
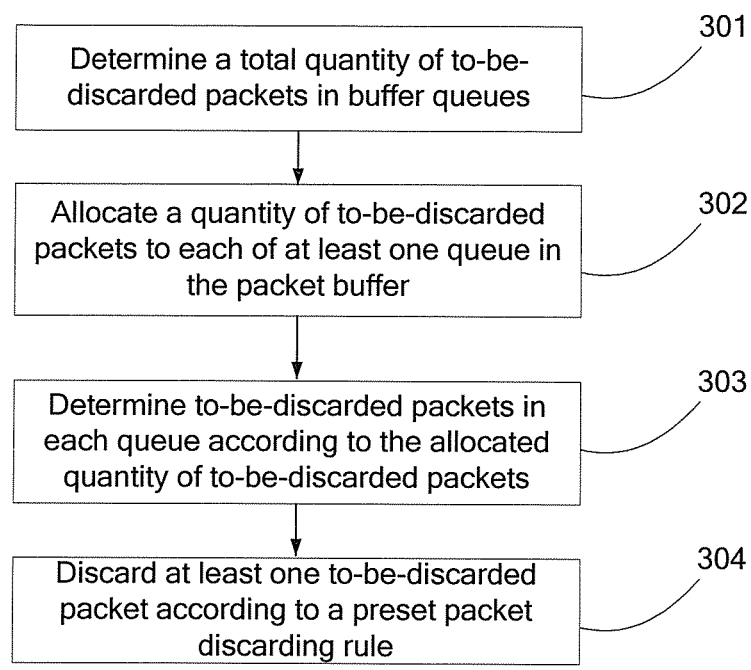
FIG. 3 is a flowchart of another packet transmission method according to an embodiment of the present invention.

Further, serving as a detailed description and a further extension of the method shown in FIG. 2, an embodiment of the present invention further provides a data transmission method. As shown in FIG. 3, the method includes:

301. Determine a total quantity of to-be-discarded packets in buffer queues.

The total quantity of to-be-discarded packets is a total quantity of packets to be discarded from an entire packet buffer area. The total quantity of to-be-discarded packets may be determined in one of the following three manners:

1) The total quantity of to-be-discarded packets is generated according to a difference between a quantity of packets that have entered the buffer queues and a preset threshold.

The preset threshold may be one proportion value or one absolute numerical value, and the preset threshold may be a quantity of packets buffered in the packet buffer area when a buffer of the packet buffer area is full, or may be lower than the quantity of packets buffered in the packet buffer area when the buffer of the packet buffer area is full. With the preset threshold being one proportion value as an example, the preset threshold may be 100% or may be 80%. The preset threshold is not higher than a preset limit value of congestion of the buffer queues. For example, when the preset limit value is 100%, the preset threshold is 80%; or, when the preset limit value is 80%, the preset threshold is also 80%.

That the preset limit value is 10000 packets and the preset threshold is 8000 packets is used as an example. When the quantity of packets that have entered the buffer queues reaches 10000, the buffer queues are congested. In this case, a quantity of packets that need to be discarded (total quantity of to-be-discarded packets) is 10000−8000=2000. That is, the quantity of packets that have entered the buffer queues is reduced to 8000 so as to vacate space of 2000 packets for packets existent in the congestion management stage.

Further, that both the preset limit value and the preset threshold are 70% is used as an example. When a proportion of the quantity of packets that have entered the buffer queues to a total quantity of packets that can be buffered in the buffer queues is 80%, the buffer queues are congested. In this case, the total quantity of to-be-discarded packets (which is reflected by a proportion herein) is 80%−70%=10%. That is, the proportion of the quantity of packets that have entered the buffer queues to the total quantity of packets that can be buffered in the buffer queues is controlled to not greater than 70%.

A setting of the preset threshold may be determined based on a setting of the preset limit value and actual conditions of packet transmission, and this embodiment of the present invention does not limit the setting of the preset limit value.

2) The total quantity of to-be-discarded packets is determined according to a quantity of first packets waiting to enter the buffer queues.

The first packets are unbuffered packets with a priority higher than a preset priority threshold in unbuffered packets, or the quantity of the first packets is a preset quantity that is set by a network administrator according to actual conditions of packet transmission. For example, when 3000 important unbuffered packets need to enter the buffer queues but the buffer queues are full at the time, 3000 packets in the buffer queues are discarded. That is, it is determined that the total quantity of to-be-discarded packets is 3000.

3) The total quantity of to-be-discarded packets is acquired from the packet discarding instruction.

The packet discarding instruction from an upper-layer transmission management device or congestion management device may carry the quantity of packets that need to be discarded from the buffer queues. The quantity of packets that need to be discarded is the total quantity of to-be-discarded packets of the buffer queues. The total quantity of to-be-discarded packets of the buffer queues is set by the upper-layer transmission management device or congestion management device according to transmission conditions.

302. Allocate a quantity of to-be-discarded packets to each of at least one queue in a packet buffer.

Logically a packet buffer area is divided into multiple buffer queues. After the total quantity of to-be-discarded packets in the packet buffer area is determined, the total quantity of to-be-discarded packets is allocated to all queues in the packet buffer area. When a quantity of to-be-discarded packets is allocated to each queue, the allocated quantity of to-be-discarded packets is an integer greater than or equal to 0. When the quantity of to-be-discarded packets allocated to a queue is 0, no packet needs to be discarded from this queue.

It should be noted that allocating a quantity of to-be-discarded packets to each queue is not specifying specific packets in the queue, but only allocating a quantity of to-be-discarded packets to each queue. Which specific packets are to be discarded from each queue is decided in subsequent steps. In this embodiment of the present invention, an average quantity of to-be-discarded packets may be allocated to multiple queues, that is, the queues have an equal quantity of to-be-discarded packets; or, different quantities of to-be-discarded packets may be allocated to the queues. This embodiment of the present invention does not limit an allocation rule for the quantity of to-be-discarded packets.

Figure 4A:
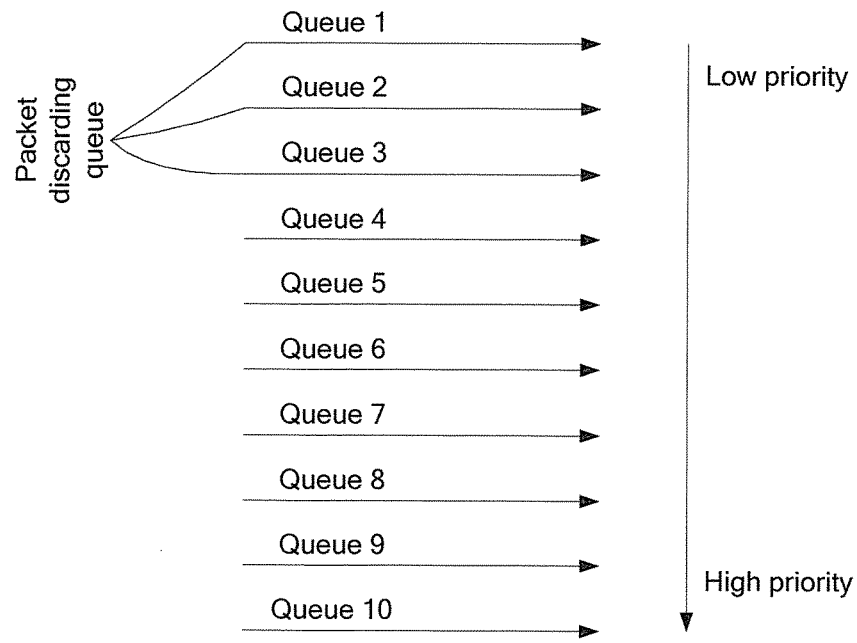
FIG. 4(*a*) and FIG. 4(*b*) are schematic diagrams of selecting at least one queue according to an embodiment of the present invention.

Optionally, a quantity of to-be-discarded packets may be allocated to each queue according to a priority of the queue. Specifically, all queues are sorted in ascending order of queue priorities, and then multiple queues are selected sequentially as packet discarding queues, where the selecting starts with a lowest-priority queue. For example, as shown in FIG. 4(a), queue priorities of queues 1 to 10 increase progressively. When it is determined that a quantity of packet discarding queues is 3, queue 1, queue 2, and queue 3, which are of lowest queue priorities, are selected as packet discarding queues. The sum of packets to be discarded from queues 1 to 3 is a total quantity of to-be-discarded packets. In addition, a quantity of packets to be discarded from queue 1 is the largest, a quantity of packets to be discarded from queue 3 is the smallest, and quantities of to-be-discarded packets allocated to queues 7 to 10 are all 0.

Figure 4B:
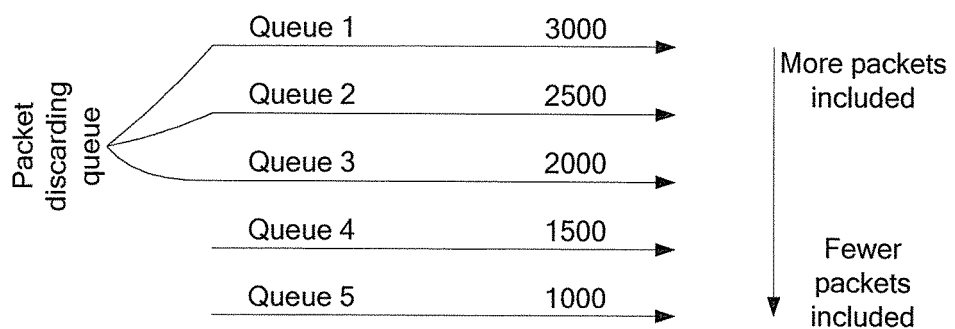

In addition, a quantity of to-be-discarded packets may also be allocated to each queue according to a quantity of included packets. Specifically, all queues are sorted in descending order of quantities of included packets, and then multiple queues are selected sequentially as packet discarding queues, where the selecting starts with a queue that includes the largest quantity of packets. For example, as shown in FIG. 4(b), quantities of packets included in queues 1 to 5 are 3000, 2500, 2000, 1500, and 1000, respectively. When it is determined that a quantity of packet discarding queues is 3, queue 1, queue 2, and queue 3 that include the largest quantities of packets are selected as packet discarding queues. The sum of packets to be discarded from queues 1 to 3 is a total quantity of to-be-discarded packets. In addition, a quantity of packets to be discarded from queue 1 is the largest, a quantity of packets to be discarded from queue 3 is the smallest, and quantities of to-be-discarded packets allocated to queues 4 and 5 are 0. The queues that include the largest quantities of packets are preferentially selected as packet discarding queues, so that packets can be discarded from the queues under greatest congestion pressure.

Generally, multiple packets in a queue carry one user service, multiple packets that carry one user service are called a service group, and in a queue, there are multiple service groups carrying multiple user services. When too many packets are discarded from one service group, service experience in an upper-layer service carried by the service group is deteriorated, that is, unable to meet QoS requirements of the upper-layer service. Therefore, on a precondition that the total quantity of to-be-discarded packets is fixed, a quantity of to-be-discarded packets allocated to each queue should not be too large so as not to affect QoS of an upper-layer service carried by a service group. Therefore, in a preferred solution of this embodiment of the present invention, in order to prevent discarding too many packets from a queue, a non-zero quantity of to-be-discarded packets may be allocated to each queue in the packet buffer area. For example, a non-zero quantity of to-be-discarded packet is allocated to each of queues 1 to 10 in FIG. 4(a).

That all queues in the packet buffer area are determined as packet discarding queues is used as an example in the following to describe how quantities of to-be-discarded packets are allocated to queues:

Specifically, quantities of to-be-discarded packets may be allocated to multiple queues in one of the following manners:

1) A total quantity of to-be-discarded packets is allocated to all queues evenly. For example, when the total quantity of to-be-discarded packets is 10000 and a quantity of packet discarding queues is 5, a quantity of to-be-discarded packets allocated to each queue is 10000/5=2000.

2) A preset proportion value is obtained according to the total quantity of to-be-discarded packets and a total quantity of packets included in all queues, and a quantity of to-be-discarded packets is allocated to each queue according to a quantity of packets included in each queue and the preset proportion value. For example, there are 4 packet discarding queues, and quantities of packets included in queues 1 to 4 are 1000, 2000, 3000, and 4000 respectively. Therefore, a total quantity of packets included in the 4 queues is 10000. A total quantity of to-be-discarded packets is 1000, and therefore, the preset proportion value is 1000/10000=10%. Each queue discards 10% of packets included in the queue. That is, quantities of to-be-discarded packets allocated to queues 1 to 4 are 100, 200, 300, and 400 respectively.

3) Preferably, considering that different queues vary in importance, when quantities of to-be-discarded packets are allocated to queues, a differentiated allocation principle may be applied according to the queue priority. That is, a queue of a higher priority discards fewer packets, and a queue of a lower priority discards more packets.

Specifically, a quantity of to-be-discarded packets is allocated to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority.

Queue priorities may be decided by types of packets in the packet buffer. The priority of a queue that buffers delay-sensitive packets (for example, a queue that buffers circuit-switched domain packets) is higher than the priority of a queue that buffers delay-insensitive packets (for example, a queue that buffers packet-switched domain packets).

A correspondence between quantities of to-be-discarded packets and queue priorities is: A queue of a lower priority discards more packets, and a queue of a higher priority discards fewer packets. The first mapping relationship table may be like the following table, in which a queue with a higher priority value has a higher priority.

| Queue priority | Quantity of to-be-discarded packets |
| --- | --- |
| 1 | 200 |
| 2 | 300 |
| 3 | 400 |
| 4 | 500 |

4) Preferably, considering that different queues include different quantities of packets, when quantities of to-be-discarded packets are allocated to queues, a differentiated allocation principle may be applied according to a quantity of included packets. That is, a queue that includes a smaller quantity of packets discards fewer packets, and a queue that includes a larger quantity of packets discards more packets.

Specifically, a quantity of to-be-discarded packets is allocated to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets. The second mapping relationship table may be like the following table:

| Quantity of packets included in a queue | Quantity of to-be-discarded packets |
| --- | --- |
| 2000 | 200 |
| 3000 | 300 |
| 4000 | 400 |
| 5000 | 500 |

303. Determine to-be-discarded packets in each queue according to the allocated quantity of to-be-discarded packets.

As mentioned above, multiple packets in a queue form one service group, and one service group carries one user service. Discarding of successive packets may result in discarding of a majority or even all of packets of a service group. Consequently, service experience in an upper-layer service carried by the service group is deteriorated, that is, QoS of the upper-layer service carried by the service group drops drastically. To prevent such a consequence, when to-be-discarded packets are determined, the to-be-discarded packets may be distributed in different positions in the entire queue according to different rules. In this way, it is accomplished that each service group in a queue discards some packets, thereby preventing concentrated discarding of packets of one service from one group.

With one queue as an example, specifically, a rule for determining to-be-discarded packets may be:

1) Select N packets at equal intervals according to an even distribution rule and determine that the N packets are to-be-discarded packets, where N is the quantity of to-be-discarded packets allocated to the queue.

N packets are selected at equal intervals in the queue and determined as to-be-discarded packets, where a size of the interval may be decided by N, the quantity of to-be-discarded packets, and a quantity of packets included in the queue. For example, when N, the quantity of to-be-discarded packets, is 40 and the quantity of packets included in the queue is 2400, the size of the packet discarding interval is 2400/40−1=59. That is, in the queue, one to-be-discarded packet is determined in every other 59 packets.

Because packets are sorted in the queue in order of queue entering time (that is, first in first out) and packets in a same service group generally have close queue entering time, the packet discarding rule in an even distribution manner can prevent discarding of a majority of packets in a service group and ensure QoS of an upper-layer service carried by each service group.

2) Select N packets randomly according to a random distribution rule and determine that the N packets are to-be-discarded packets, where N is the quantity of to-be-discarded packets allocated to the queue.

Similar to effects of the even distribution rule, the random distribution rule can also prevent discarding of several successive packets, and thereby accomplish an effect of preventing discarding of a majority of packets in a service group. In addition, N packets may be selected randomly according to a binomial normal distribution rule and determined as to-be-discarded packets.

Figure 5:
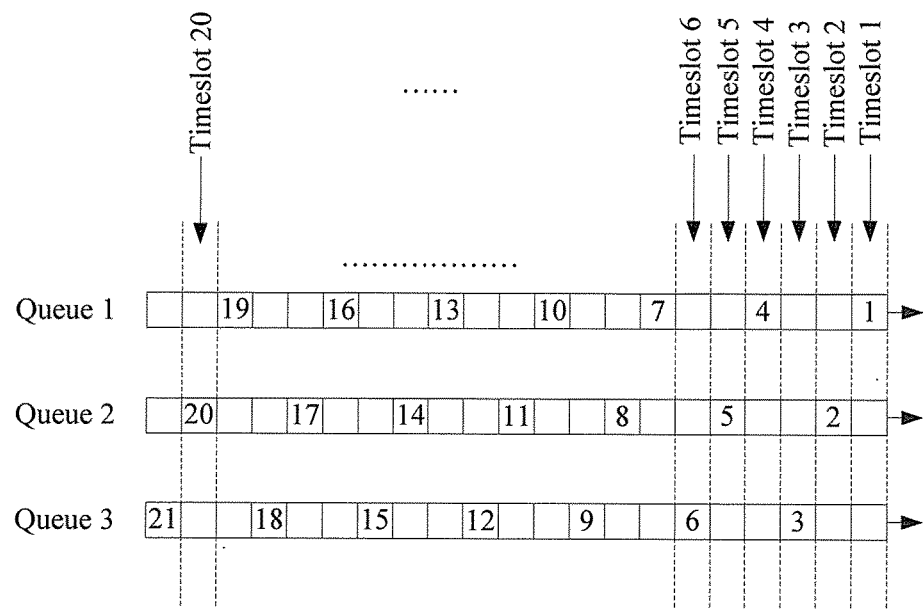
FIG. 5 is a schematic diagram of polling-based packet discarding according to an embodiment of the present invention.

Further, in another preferred solution of this embodiment of the present invention, multiple queues may be polled for packet discarding, so as to prevent discarding of successive packets in a queue. Specifically, the packet discarding queues are sorted according to a first sorting rule to obtain sorted queues. The first sorting rule includes but is not limited to: sorting in descending order of queue identifiers, sorting in ascending order of queue priorities, or sorting in descending order of quantities of included packets. After the sorting is complete, polling starts with one end of the sorted queues, and the first packet in each queue is determined to be a to-be-discarded packet until a quantity of determined to-be-discarded packets reaches the total quantity of to-be-discarded packets. For example, as shown in FIG. 5, that three queues are polled to determine to-be-discarded packets is used as an example. In FIG. 5, one rectangle in the queues represents one packet. The front-most packet in queue 1 in timeslot 1 is determined to be to-be-discarded packet 1, the front-most packet in queue 2 in timeslot 2 is determined to be to-be-discarded packet 2, and the front-most packet in queue 3 in timeslot 3 is determined to be to-be-discarded packet 3. Subsequently, queues 1, 2 and 3 are polled again. That is, the second packet in queue 1 in timeslot 4 is determined to be to-be-discarded packet 4, the second packet in queue 2 in timeslot 5 is determined to be to-be-discarded packet 5, the second packet in queue 3 in timeslot 6 is determined to be to-be-discarded packet 6 . . . , and so on. The order of polling the three queues to determine the to-be-discarded packets is indicated by the order of reference numbers in FIG. 5. For the three queues in FIG. 5 as a whole, to-be-discarded packets are determined successively. However, for one of the queues, to-be-discarded packets are determined at equal intervals, where the interval is decided by a quantity of queues. Therefore, this preferred solution can also implement a mechanism of packet discarding at equal intervals, and can prevent impact caused by discarding of successive packets on one service group and thereby ensure QoS of an upper-layer service carried by each service group.

304. Discard at least one to-be-discarded packet according to a preset packet discarding rule.

After the to-be-discarded packets are determined, the to-be-discarded packets are discarded according to a preset packet discarding rule. Specifically, the preset packet discarding rule includes:

1) Perform discarding according to whether all to-be-discarded packets have been discarded.

An index identifier of each to-be-discarded packet is acquired to generate a to-be-discarded packet group. The index identifier is used to uniquely identify and locate a packet, and the index identifier may be a combination of a queue identifier of the to-be-discarded packet and a location identifier of the to-be-discarded packet. For example, a to-be-discarded packet belongs to queue 3, and its location in queue 3 is the 25$^{th}$ packet counted from the queue egress, and therefore, the index identifier of the to-be-discarded packet is [3, 25]. The index identifiers of all to-be-discarded packets are put together to create a to-be-discarded packet group. A sorting location of an index identifier of each to-be-discarded packet in the to-be-discarded packet group may be decided by the order of time when the packet is determined to be a to-be-discarded packet.

Whether a to-be-discarded packet that is not discarded remains in the to-be-discarded packet group is determined. If an index identifier of any to-be-discarded packet remains in the to-be-discarded packet group, the to-be-discarded packet corresponding to at least one index identifier is selected for discarding. If no index identifier of any to-be-discarded packet remains in the to-be-discarded packet group, it indicates that all to-be-discarded packets have been discarded, and step 301 to step 303 may be performed sequentially again to further determine to-be-discarded packets.

When to-be-discarded packets corresponding to at least one index identifier are selected for discarding, the packets may be discarded at multiple attempts. For example, one packet is discarded at a time, or four packets are discarded at a time. After each attempt of packet discarding, it is determined again whether any to-be-discarded packet that is not discarded remains in the to-be-discarded packet group, and then according to a result of the determining, a next attempt of packet discarding is performed or step 301 to step 303 are performed sequentially again.

In one attempt of packet discarding (for example, discarding of one packet), an index identifier may be selected randomly in the to-be-discarded packet group, or an index identifier may be selected according to sorting order of index identifiers in the to-be-discarded packet group. After the index identifier is selected, a queue in which the packet corresponding to the index identifier is located and a location of the packet in the queue are found according to the index identifier. That is, a logical address of the packet is found according to the index identifier, then a corresponding physical buffer address is looked up according to the logical address of the packet, and finally, the packet is deleted from the found physical buffer address.

2) Perform discarding according to a congestion statue of the packet buffer.

The index identifier of each to-be-discarded packet is acquired to generate a to-be-discarded packet group. A sorting location of an index identifier of each to-be-discarded packet in the to-be-discarded packet group may be decided by the order of time when the packet is determined to be a to-be-discarded packet.

It is determined whether, currently, the packet buffer is still in a congested status or a preset limit value is exceeded. If currently, the packet buffer is still in a congested status or the preset limit value is exceeded, to-be-discarded packets corresponding to at least one index identifier are selected for discarding; and if currently, the packet buffer is not congested or the preset limit value is not exceeded, remaining to-be-discarded packets in the to-be-discarded packet group are not discarded.

When to-be-discarded packets corresponding to at least one index identifier are selected for discarding, the packets may be discarded at multiple attempts. For example, one packet is discarded at a time, or four packets are discarded at a time. After each attempt of packet discarding, it is determined again whether, currently, the packet buffer is still in a congested status or the preset limit value is exceeded, and then according to a result of the determining, a next attempt of packet discarding is performed or the packet discarding is stopped.

In one attempt of packet discarding (for example, discarding of one packet), an index identifier may be selected randomly in the to-be-discarded packet group, or an index identifier may be selected according to sorting order of index identifiers in the to-be-discarded packet group. After the index identifier is selected, a queue in which the packet corresponding to the index identifier is located and a location of the packet in the queue are found according to the index identifier. That is, a logical address of the packet is found according to the index identifier, then a corresponding physical buffer address is looked up according to the logical address of the packet, and finally, the packet is deleted from the found physical buffer address.

3) After each to-be-discarded packet is determined, acquire an index identifier of the to-be-discarded packet, and then discard the to-be-discarded packet according to the index identifier.

In the process of determining to-be-discarded packets in each queue according to the allocated quantity of to-be-discarded packets in step 303, after each to-be-discarded packet is determined, the to-be-discarded packet is discarded immediately. Specifically, the discarding manner is: acquiring an index identifier of the to-be-discarded packet, and finding a queue in which the corresponding packet is located and a location of the packet in the queue according to the index identifier. That is, a logical address of the packet is found according to the index identifier, and then a corresponding physical buffer address is looked up according to the logical address of the packet, and finally, the packet is deleted from the found physical buffer address.

The foregoing three preset packet discarding rules are merely exemplary, and the packet discarding rule(s) is/are not limited thereto in practical application.

Optionally, in an application of the embodiments of the present invention, based on the packet discarding process in FIG. 3, the packet discarding mechanism in the forgoing embodiments of the present invention may also be applied to a congestion management stage and a packet buffering stage.

In the congestion management stage, unbuffered packets are discarded; and in the packet buffering stage, buffered packets are discarded. When queue congestion occurs, an upper-layer transmission management device determines the total quantity of to-be-discarded packets, and then allocates the total quantity of to-be-discarded packets to a congestion management device and buffer queues. For example, the upper-layer transmission management device allocates a first quantity of to-be-discarded packets to the packet buffering stage, where the first quantity of to-be-discarded packets is less than or equal to the total quantity of to-be-discarded packets, and then a difference between the total quantity of to-be-discarded packets and the first quantity of to-be-discarded packets is determined to be a second quantity of to-be-discarded packets, and the second quantity of to-be-discarded packets is allocated to the congestion management stage. The buffer queues use the second quantity of to-be-discarded packets as the total quantity of to-be-discarded packets, and discard packets according to the implementation manner in the foregoing step 301 to step 304. The congestion management device may discard, with reference to the packet discarding manner shown in FIG. 3 and characteristics of the device, unbuffered packets that amount to the second quantity of to-be-discarded packets, which can be implemented by a person skilled in the art without any creative effort, and this is not further described in this embodiment of the present invention.

In the prior art, a buffer queue is used only for packet buffering. Based on a first-in-first-out rule, the buffer queue buffers packets in order of queue-entering time of the packets. When the buffer queue is congested, a congestion management mechanism discards some unbuffered packets to relieve congestion pressure of the queue. Generally, the congestion management mechanism discards unbuffered packets of less importance in to-be-queued packets to prevent discarding of unbuffered packets of greater importance and prevent affecting QoS of an important service. However, when the buffer queue remains congested, a quantity of unbuffered packets keeps increasing. If an unbuffered packet of even greater importance is added, the congestion management mechanism discards a previously unbuffered packet of greater importance, which affects the QoS of the important service carried by the packet. The packet transmission method according to this embodiment of the present invention can discard some unimportant packets in a packet buffering stage, and relieve packet discarding pressure in a congestion management stage, thereby preventing a congestion management mechanism from discarding an important unbuffered packet so as to affect QoS of an important service. In addition, when determining a to-be-discarded packet, the packet transmission method according to this embodiment of the present invention can use mechanisms such as equal-interval discarding of packets, random discarding of packets, and polling-based discarding of packets to prevent concentrated discarding of packets from one service group and reduce deterioration, caused by discarding of successive packets, of experience in an upper-layer service carried by a single service group, which can ensure upper-layer service quality of a single service while packets are discarded.

The packet transmission method according to this embodiment of the present invention is applicable to a process of packet transmission between devices and also applicable to a process of packet transmission between modules in a device. When the method is applied to a process of packet transmission between devices, the devices may be but are not limited to base stations, routers or switches; and when the method is applied to a process packet transmission between modules in a device, the modules may be but are not limited to communications processors or network processors. In practical application, this embodiment of the present invention is applicable to all devices capable of storing data and sending data, and the method according to this embodiment of the present invention is applicable to all devices that have a memory and a transmitter.

Figure 6:
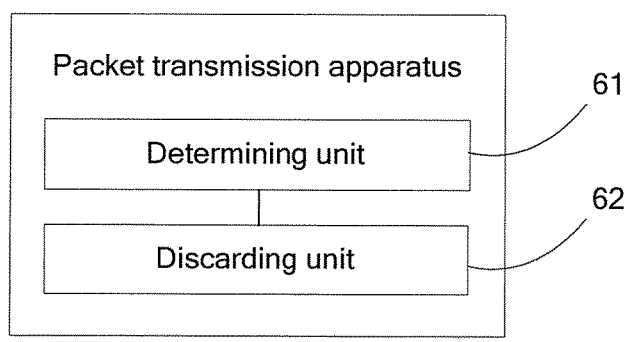
FIG. 6 is a schematic structural diagram of a first packet transmission apparatus according to an embodiment of the present invention.

With reference to implementation of the foregoing method embodiments, an embodiment of the present invention further provides a packet transmission apparatus to implement the method shown in FIG. 2 or FIG. 3. As shown in FIG. 6, the apparatus includes a determining unit 61 and a discarding unit 62.

The determining unit 61 is configured to determine, when packet congestion occurs or network bandwidth decreases, at least one to-be-discarded packet in a packet buffer.

The discarding unit 62 is configured to discard the at least one to-be-discarded packet determined by the determining unit 61 so that at least one unbuffered packet enters the packet buffer to prevent discarding too many unbuffered packets, where the unbuffered packet is a packet that has not entered the packet buffer.

Figure 7:
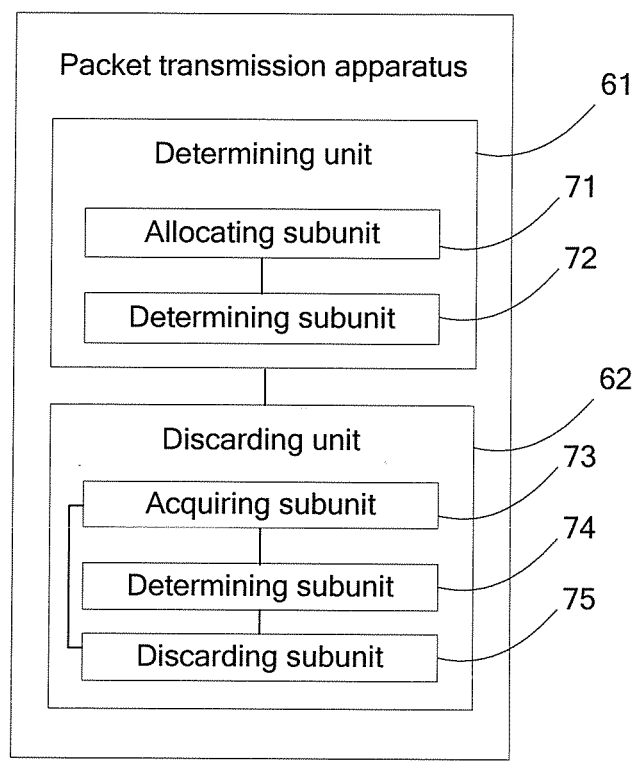
FIG. 7 is a schematic structural diagram of a second packet transmission apparatus according to an embodiment of the present invention.

Further, as shown in FIG. 7, the determining unit 61 specifically includes:

an allocating subunit 71, configured to allocate a quantity of to-be-discarded packets to each of at least one queue in the packet buffer, where the quantity of to-be-discarded packets is an integer greater than or equal to 0.

Further, the allocating subunit 71 is specifically configured to:

allocate a quantity of to-be-discarded packets to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority; or allocate a quantity of to-be-discarded packets to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets.

Further, as shown in FIG. 7, the determining unit 61 further includes:

a determining subunit 72, configured to:

select N packets at equal intervals in each queue according to an even distribution rule and determine that the N packets are to-be-discarded packets, where N is the quantity of to-be-discarded packets allocated by the allocating subunit 71 to the queue; or select N packets randomly in each queue according to a random distribution rule and determine that the N packets are to-be-discarded packets, where N is the quantity of to-be-discarded packets allocated by the allocating subunit 71 to the queue; or sort the at least one queue according to a first sorting rule to obtain sorted queues, perform polling from one end of the sorted queues and determine that the first packet in each queue is a to-be-discarded packet; when a quantity of to-be-discarded packets of a queue reaches a quantity of to-be-discarded packets allocated by the allocating subunit 71 to the queue, remove the queue from the sorted queues; and when a quantity of queues in the sorted queues is 0, end, by the determining subunit 72, the determining of to-be-discarded packets.

Further, the discarding unit 62 is specifically configured to discard, according to a preset packet discarding rule, the at least one to-be-discarded packet determined by the determining unit 61.

Further, as shown in FIG. 7, the discarding unit 62 specifically includes:

an acquiring subunit 73, configured to acquire an index identifier of each to-be-discarded packet to generate a to-be-discarded packet group, where the index identifier is a combination of a queue identifier of the to-be-discarded packet and a location identifier of the to-be-discarded packet;

a determining subunit 74, configured to determine whether a to-be-discarded packet that is not discarded remains in the to-be-discarded packet group generated by the acquiring subunit 73; and a discarding subunit 75, configured to select, when a result of the determining by the determining subunit 74 is yes, a to-be-discarded packet corresponding to at least one index identifier to discard it.

Further, the acquiring subunit 73 is further configured to acquire, after each to-be-discarded packet is determined by the determining unit 61, an index identifier of the to-be-discarded packet; and the discarding subunit 75 is further configured to discard the to-be-discarded packet according to the index identifier acquired by the acquiring subunit 73.

Figure 8:
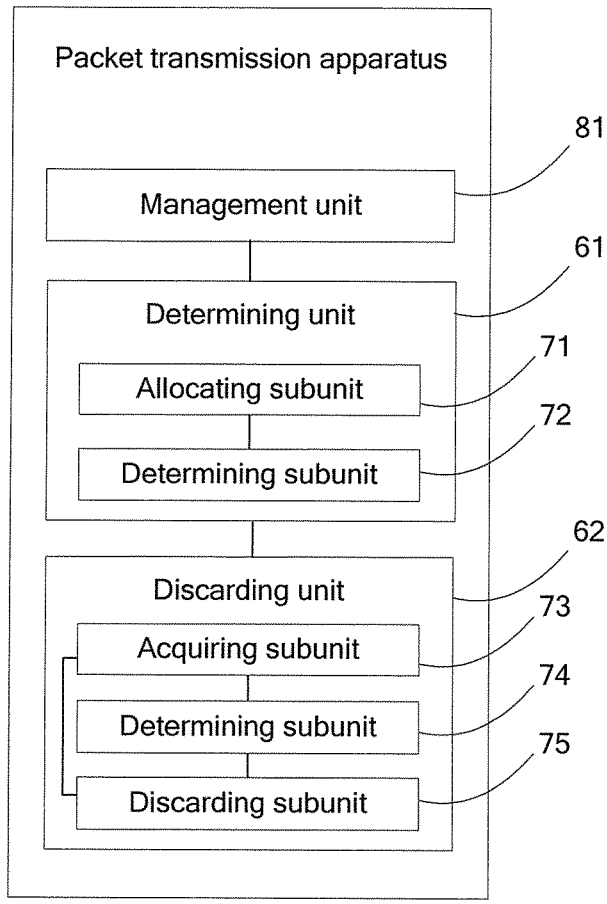
FIG. 8 is a schematic structural diagram of a third packet transmission apparatus according to an embodiment of the present invention.

Further, as shown in FIG. 8, the apparatus further includes:

a management unit 81, configured to:

determine a total quantity of to-be-discarded packets;

allocate a first quantity of to-be-discarded packets to the packet buffer for discarding, where the first quantity of to-be-discarded packets is less than or equal to the total quantity of to-be-discarded packets; and determine that packets, of the first quantity of to-be-discarded packets, in the packet buffer are to-be-discarded packets.

In the prior art, a buffer queue is used only for packet buffering. Based on a first-in-first-out rule, the buffer queue buffers packets in order of queue-entering time of the packets. When the buffer queue is congested, a congestion management mechanism discards some unbuffered packets to relieve congestion pressure of the queue. Generally, the congestion management mechanism discards unbuffered packets of less importance in to-be-queued packets to prevent discarding of unbuffered packets of greater importance and prevent affecting QoS of an important service. However, when the buffer queue remains congested, a quantity of unbuffered packets keeps increasing. If an unbuffered packet of even greater importance is added, the congestion management mechanism discards a previously unbuffered packet of greater importance, which affects the QoS of the important service carried by the packet. The packet transmission apparatus according to this embodiment of the present invention can discard some unimportant packets in a packet buffering stage, and relieve packet discarding pressure in a congestion management stage, thereby preventing a congestion management mechanism from discarding an important unbuffered packet so as to affect QoS of an important service. In addition, when determining a to-be-discarded packet, the packet transmission apparatus according to this embodiment of the present invention can use mechanisms such as equal-interval discarding of packets, random discarding of packets, and polling-based discarding of packets to prevent concentrated discarding of packets from one service group and reduce deterioration, caused by discarding of successive packets, of experience in an upper-layer service carried by a single service group, which can ensure upper-layer service quality of a single service while packets are discarded.

The packet transmission apparatus according to this embodiment of the present invention may be but is not limited to a base station, a router, or a switch. In addition, the packet transmission apparatus according to this embodiment of the present invention may a module in a device, where the module may be but is not limited to a communications processor or a network processor. In practical application, all devices with a storage function and a transmitting function fall within the protection scope of the apparatus according to this embodiment of the present invention.

Figure 9:
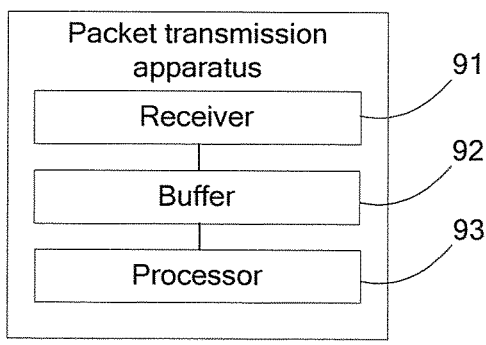
FIG. 9 is a schematic structural diagram of a fourth packet transmission apparatus according to an embodiment of the present invention.

With reference to implementation of the foregoing method embodiments, an embodiment of the present invention further provides a packet transmission apparatus to implement the method shown in FIG. 2 or FIG. 3. As shown in FIG. 9, the apparatus includes a receiver 91, a buffer 92, and a processor 93.

The receiver 91 is configured to receive a to-be-sent packet.

The buffer 92 is configured to buffer the packet received by the receiver 91.

The processor 93 is configured to: when packet congestion occurs or network bandwidth decreases, determine at least one to-be-discarded packet in packets buffered by the buffer 92; and discard the at least one to-be-discarded packet so that at least one unbuffered packet enters the buffer to prevent discarding too many unbuffered packets, where the unbuffered packet is a packet that has not entered the buffer 92.

Further, the processor 93 is specifically configured to:

allocate a quantity of to-be-discarded packets to each of at least one queue in the buffer, where the quantity of to-be-discarded packets is an integer greater than or equal to 0.

Further, the processor 93 is further specifically configured to:

allocate a quantity of to-be-discarded packets to each queue according to a first mapping relationship table and a priority of the queue, where the first mapping table is used to represent a mapping relationship between queue priorities and quantities of to-be-discarded packets, where a quantity of to-be-discarded packets of a queue with a higher priority is less than a quantity of to-be-discarded packets of a queue with a lower priority; or allocate a quantity of to-be-discarded packets to each queue according to a second mapping relationship table and a quantity of packets included in a queue, where the second mapping table is used to represent a mapping relationship between quantities of packets included in queues and quantities of to-be-discarded packets, where a quantity of to-be-discarded packets of a queue that includes a larger quantity of packets is greater than a quantity of to-be-discarded packets of a queue that includes a smaller quantity of packets.

Further, the processor 93 is further specifically configured to:

select N packets at equal intervals in each queue according to an even distribution rule and determine that the N packets are to-be-discarded packets, where N is the quantity of to-be-discarded packets allocated to the queue; or select N packets randomly in each queue according to a random distribution rule and determine that the N packets are to-be-discarded packets, where N is the quantity of to-be-discarded packets allocated to the queue; or sort the at least one queue according to a first sorting rule to obtain sorted queues, perform polling from one end of the sorted queues and determine that a first packet in each queue is a to-be-discarded packet; when a quantity of to-be-discarded packets of a queue reaches a quantity of to-be-discarded packets allocated to the queue, remove the queue from the sorted queues; and when a quantity of queues in the sorted queues is 0, end the determining of to-be-discarded packets.

Further, the processor 93 is further specifically configured to:

discard the at least one to-be-discarded packet according to a preset packet discarding rule.

Further, the processor 93 is further specifically configured to:

acquire an index identifier of each to-be-discarded packet to generate a to-be-discarded packet group, where the index identifier is a combination of a queue identifier of the to-be-discarded packet and a location identifier of the to-be-discarded packet;

determine whether a to-be-discarded packet that is not discarded remains in the to-be-discarded packet group; and select, when a result of the determining is yes, a to-be-discarded packet corresponding to at least one index identifier to discard it.

Further, the processor 93 is further specifically configured to:

acquire, after each to-be-discarded packet is determined, an index identifier of the to-be-discarded packet, and discard the to-be-discarded packet according to the index identifier.

Further, the processor 93 is further specifically configured to:

determine a total quantity of to-be-discarded packets;

allocate a first quantity of to-be-discarded packets to the buffer, where the first quantity of to-be-discarded packets is less than or equal to the total quantity of to-be-discarded packets; and determine that packets, of the first quantity of to-be-discarded packets, in the buffer are to-be-discarded packets.

In the prior art, a buffer queue is used only for packet buffering. Based on a first-in-first-out rule, the buffer queue buffers the packets in order of queue-entering time of the packets. When the buffer queue is congested, a congestion management mechanism discards some unbuffered packets to relieve congestion pressure of the queue. Generally, the congestion management mechanism discards unbuffered packets of less importance in to-be-queued packets to prevent discarding of unbuffered packets of greater importance and prevent affecting QoS of an important service. However, when the buffer queue remains congested, a quantity of unbuffered packets keeps increasing. If an unbuffered packet of even greater importance is added, the congestion management mechanism discards a previously unbuffered packet of greater importance, which affects the QoS of the important service carried by the packet. The packet transmission apparatus according to this embodiment of the present invention can discard some unimportant packets in a packet buffering stage, and relieve packet discarding pressure in a congestion management stage, thereby preventing a congestion management mechanism from discarding an important unbuffered packet so as to affect QoS of an important service. In addition, when determining a to-be-discarded packet, the packet transmission apparatus according to this embodiment of the present invention can use mechanisms such as equal-interval discarding of packets, random discarding of packets, and polling-based discarding of packets to prevent concentrated discarding of packets from one service group and reduce deterioration, caused by discarding of successive packets, of experience in an upper-layer service carried by a single service group, which can ensure upper-layer service quality of a single service while packets are discarded.

The packet transmission apparatus according to this embodiment of the present invention may be but is not limited to a base station, a router, or a switch. In addition, the packet transmission apparatus according to this embodiment of the present invention may a module in a device, where the module may be but is not limited to a communications processor or a network processor. In practical application, all devices with a storage function and a transmitting function fall within the protection scope of the apparatus according to this embodiment of the present invention.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for exemplarily describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet transmission method, comprising:
   determining, when packet congestion occurs or network bandwidth decreases, at least one to-be-discarded packet in a packet buffer; and
   discarding the at least one to-be-discarded packet so that at least one unbuffered packet enters the packet buffer to prevent discarding too many unbuffered packets, wherein the unbuffered packet is a packet that has not entered the packet buffer, wherein discarding the at least one to-be-discarded packet comprises:
      discarding the at least one to-be-discarded packet according to a preset packet discarding rule, wherein discarding the at least one to-be-discarded packet according to the preset packet discarding rule comprises:
         acquiring an index identifier of each of the at least one to-be-discarded packet to generate a to-be-discarded packet group, wherein the index identifier is a combination of a queue identifier of each of the at least one to-be-discarded packet and a location identifier of each of the at least one to-be-discarded packet,
         determining whether a to-be-discarded packet that is not discarded remains in the to-be-discarded packet group, and
         selecting, when a to-be-discarded packet that is not discarded remains in the to-be-discarded packet group, a to-be-discarded packet corresponding to at least one index identifier to discard it.

2. The method according to claim 1, wherein determining the at least one to-be-discarded packet in the packet buffer comprises:
   allocating a quantity of the to-be-discarded packets to each of at least one queue in the packet buffer, wherein the quantity of the to-be-discarded packets is an integer greater than or equal to 0.

3. The method according to claim 2, wherein allocating the quantity of the to-be-discarded packets to each of the at least one queue in the packet buffer comprises:
   allocating the quantity of the to-be-discarded packets to each of the at least one queue according to a first mapping relationship table and a priority of each of the at least one queue, wherein the first mapping relationship table is used to represent a mapping relationship between queue priorities and quantities of to-be-discarded packets, wherein a quantity of to-be-discarded packets of a queue with a higher priority is less than a quantity of to-be-discarded packets of a queue with a lower priority; or
   allocating the quantity of the to-be-discarded packets to each of the at least one queue according to a second mapping relationship table and a quantity of packets comprised in each of the at least one queue, wherein the second mapping relationship table is used to represent a mapping relationship between quantities of packets comprised in queues and quantities of to-be-discarded packets, wherein a quantity of to-be-discarded packets of a queue that comprises a larger quantity of packets is greater than a quantity of to-be-discarded packets of a queue that comprises a smaller quantity of packets.

4. The method according to claim 2, wherein determining the at least one to-be-discarded packet in the packet buffer comprises:
   selecting N packets at equal intervals in each of the at least one queue according to an even distribution rule and determining that the N packets are the to-be-discarded packets, wherein N is the quantity of the to-be-discarded packets allocated to the queue; or
   selecting N packets randomly in each of the at least one queue according to a random distribution rule and determining that the N packets are the to-be-discarded packets, wherein N is the quantity of the to-be-discarded packets allocated to the queue; or
   sorting each of the at least one queue according to a first sorting rule to obtain sorted queues, performing polling from one end of the sorted queues and determining that a first packet in each queue is the at least one to-be-discarded packet, when a quantity of the to-be-discarded packets of a queue reaches a quantity of to-be-discarded packets allocated to the queue, removing the queue from the sorted queues, and when a quantity of queues in the sorted queues is 0, ending the determining of the to-be-discarded packets.

5. A packet transmission method, comprising:
   determining, when packet congestion occurs or network bandwidth decreases, at least one to-be-discarded packet in a packet buffer; and
   discarding the at least one to-be-discarded packet so that at least one unbuffered packet enters the packet buffer to prevent discarding too many unbuffered packets, wherein the unbuffered packet is a packet that has not entered the packet buffer;
   wherein before determining the at least one to-be-discarded packet in the packet buffer, the method further comprises:
      determining a total quantity of to-be-discarded packets, and
      allocating a first quantity of the to-be-discarded packets to the packet buffer for discarding, wherein the first quantity of the to-be-discarded packets is less than or equal to the total quantity of the to-be-discarded packets; and determining the at least one to-be-discarded packet in the packet buffer comprises:
  determining that packets, of the first quantity of the to-be-discarded packets, in the packet buffer are the to-be-discarded packets.

6. A packet transmission apparatus, comprising:
a receiver, configured to receive a packet;
a buffer, configured to buffer the packet received by the receiver; and
a processor, configured to:
  when packet congestion occurs or network bandwidth decreases, determine at least one to-be-discarded packet in packets buffered by the buffer;
  discard the at least one to-be-discarded packet so that at least one unbuffered packet enters the buffer to prevent discarding too many unbuffered packets, wherein the unbuffered packet is a packet that has not entered the buffer;
  discard the at least one to-be-discarded packet according to a preset packet discarding rule;
  acquire an index identifier of each of the at least one to-be-discarded packet to generate a to-be-discarded packet group, wherein the index identifier is a combination of a queue identifier of each of the at least one to-be-discarded packet and a location identifier of each of the at least one to-be-discarded packet;
  determine whether a to-be-discarded packet that is not discarded remains in the to-be-discarded packet group; and
  select, when a to-be-discarded packet that is not discarded remains in the to-be-discarded packet group, a to-be-discarded packet corresponding to at least one index identifier to discard it.

7. The apparatus according to claim 6, wherein the processor is configured to:
  allocate a quantity of to-be-discarded packets to each of at least one queue in the buffer, wherein the quantity of the to-be-discarded packets is an integer greater than or equal to 0.

8. The apparatus according to claim 7, wherein the processor is further configured to:
  allocate the quantity of the to-be-discarded packets to each of the at least one queue according to a first mapping relationship table and a priority of each of the at least one queue, wherein the first mapping relationship table is used to represent a mapping relationship between queue priorities and quantities of to-be-discarded packets, wherein a quantity of to-be-discarded packets of a queue with a higher priority is less than a quantity of to-be-discarded packets of a queue with a lower priority; or
  allocate the quantity of the to-be-discarded packets to each of the at least one queue according to a second mapping relationship table and a quantity of packets comprised in each of the at least one queue, wherein the second mapping relationship table is used to represent a mapping relationship between quantities of packets comprised in queues and quantities of to-be-discarded packets, wherein a quantity of to-be-discarded packets of a queue that comprises a larger quantity of packets is greater than a quantity of to-be-discarded packets of a queue that comprises a smaller quantity of packets.

9. The apparatus according to claim 7, wherein the processor is further configured to:
  select N packets at equal intervals in each of the at least one queue according to an even distribution rule and determine that the N packets are the to-be-discarded packets, wherein N is the quantity of the to-be-discarded packets allocated to the queue; or
  select N packets randomly in each of the at least one queue according to a random distribution rule and determine that the N packets are the to-be-discarded packets, wherein N is the quantity of the to-be-discarded packets allocated to the queue; or
  sort each of the at least one queue according to a first sorting rule to obtain sorted queues, perform polling from one end of the sorted queues and determine that a first packet in each queue is the at least one to-be-discarded packet, when a quantity of the to-be-discarded packets of a queue reaches a quantity of to-be-discarded packets allocated to the queue, remove the queue from the sorted queues, and when a quantity of queues in the sorted queues is 0, end the determining of the to-be-discarded packets.

10. A packet transmission apparatus, comprising:
a receiver, configured to receive a packet;
a buffer, configured to buffer the packet received by the receiver; and
a processor, configured to:
  when packet congestion occurs or network bandwidth decreases, determine at least one to-be-discarded packet in packets buffered by the buffer;
  discard the at least one to-be-discarded packet so that at least one unbuffered packet enters the buffer to prevent discarding too many unbuffered packets, wherein the unbuffered packet is a packet that has not entered the buffer;
  determine a total quantity of the to-be-discarded packets;
  allocate a first quantity of the to-be-discarded packets to the buffer, wherein the first quantity of the to-be-discarded packets is less than or equal to the total quantity of the to-be-discarded packets; and
  determine that packets, of the first quantity of the to-be-discarded packets, in the buffer are the to-be-discarded packets.

* * * * *